United States Patent
Gialamas et al.

(10) Patent No.: US 10,186,166 B2
(45) Date of Patent: Jan. 22, 2019

(54) ENHANCING STRINGED INSTRUMENT LEARNING WITH A WEARABLE DEVICE

(71) Applicant: Angelos Gialamas, Kalamata (GR)

(72) Inventors: Angelos Gialamas, Kalamata (GR);
Nick Giannaris, San Jose, CA (US);
Kenneth Kim, San Jose, CA (US);
Joseph Eamonn L Clerkin, Belmont, CA (US)

(*) Notice: Subject to any disclaimer, the term of this patent is extended or adjusted under 35 U.S.C. 154(b) by 0 days.

(21) Appl. No.: 15/465,476

(22) Filed: Mar. 21, 2017

(65) Prior Publication Data

US 2017/0309199 A1   Oct. 26, 2017

(51) Int. Cl.
*G09B 15/00* (2006.01)
*G09B 15/06* (2006.01)
*G10H 1/00* (2006.01)
*G10H 1/32* (2006.01)

(52) U.S. Cl.
CPC ........... *G09B 15/06* (2013.01); *G10H 1/0016* (2013.01); *G10H 1/32* (2013.01); *G10H 2210/091* (2013.01); *G10H 2220/311* (2013.01); *G10H 2220/326* (2013.01); *G10H 2240/211* (2013.01)

(58) Field of Classification Search
USPC .......................................................... 84/465
See application file for complete search history.

(56) References Cited

U.S. PATENT DOCUMENTS

| | | | | |
|---|---|---|---|---|
| 4,920,848 A | * | 5/1990 | Suzuki | G10H 1/18 341/27 |
| 5,005,460 A | * | 4/1991 | Suzuki | G06F 3/014 84/600 |
| 5,151,553 A | * | 9/1992 | Suzuki | G10H 1/0558 341/20 |
| 5,338,891 A | * | 8/1994 | Masubuchi | G10H 1/0558 84/600 |
| 8,362,350 B2 | * | 1/2013 | Kockovic | G10H 1/34 84/743 |
| 9,905,207 B2 | * | 2/2018 | Louhivuori | G10H 1/0008 |
| 2011/0132181 A1 | | 6/2011 | Kockovic | |
| 2015/0027297 A1 | | 1/2015 | Avitabile et al. | |

OTHER PUBLICATIONS

Markow et al. "Mobile Music Touch: Using Haptic Stimulation for Passive Rehabilitation and Learning"; College of Computing, Georgia Institute of Technology, Publication [online]. Jul. 2, 2014 [retrieved Jun. 18, 2017]. Retrieved from the Internet: <URL: https://smartech.gatech.edu/handle/1853/43665>; entire document.

* cited by examiner

*Primary Examiner* — Christopher Uhlir
(74) *Attorney, Agent, or Firm* — Law Office of Dorian Cartwright; Dorian Cartwright (57) ABSTRACT

Enhanced stringed instrument learning is provided by a wearable device. A control unit comprising a processor and a memory device is integrated with a frame, of the wearable device, formed to fit over a hand of a user while playing a stringed instrument. A finger assembly is provided each finger of the hand and is coupled to the frame to immobilize a finger of the hand while playing the stringed instrument. A sensor array is coupled to each finger assembly and to the control unit to determine at least a positioning of fingers on the stringed instrument. The sensor also sends user performance data to the control unit. The control unit analyzes the user performance data and outputs feedback to the user based on the performance data analysis.

11 Claims, 11 Drawing Sheets

ENHANCING STRINGED INSTRUMENT LEARNING WITH A WEARABLE DEVICE

FIELD OF THE INVENTION

The invention relates generally to computers and networks, and more specifically, to enhancing stringed instrument learning with a wearable device.

BACKGROUND

Chordophone musical instruments produce sound from vibrating strings. When playing a stringed musical instrument, a musician can pluck to create vibration for sound. Different types of music, such as pizzicato and flamenco, have many different string techniques for musicians to master.

Problematically, conventional feedback for basic and advanced string techniques requires a music instructor. The tones and positions must be manually observed and corrected properly by the instructor. Furthermore, instructor feedback is straightforward blunt, for example, faster, louder, and wrong tone, without precise quantification.

What is needed is a robust technique to enhance stringed instrument learning.

SUMMARY

The shortcomings of the prior art are addressed by methods, (non-transitory) computer program products, and systems for enhancing stringed instrument learning with a wearable device.

In one embodiment, a control unit comprising a processor and a memory device is integrated with a frame formed to fit over a hand of a user while playing a stringed instrument. A finger assembly is provided each finger of the hand and is coupled to the frame to immobilize a finger of the hand while playing the stringed instrument. A sensor array is coupled to each finger assembly and to the control unit to determine at least a positioning of fingers on the stringed instrument. The sensor also sends user performance data to the control unit.

In another embodiment, the control unit analyzes the user performance data and outputs feedback to the user based on the performance data analysis.

Advantageously, learning and training techniques are improved for stringed instruments.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

Methods, (non-transitory) computer program products, and systems for stringed instrument learning with a wearable device, as described herein. One application of the wearable device is while learning and training on a classical guitar where guitar strings are plucked by fingers. Another application can be for Rasgueados, a guitar strumming technique associated with flamenco guitar music.

I. Systems to Enhance Stringed Instrument Learning (FIGS. 1-3)

Figure 1:
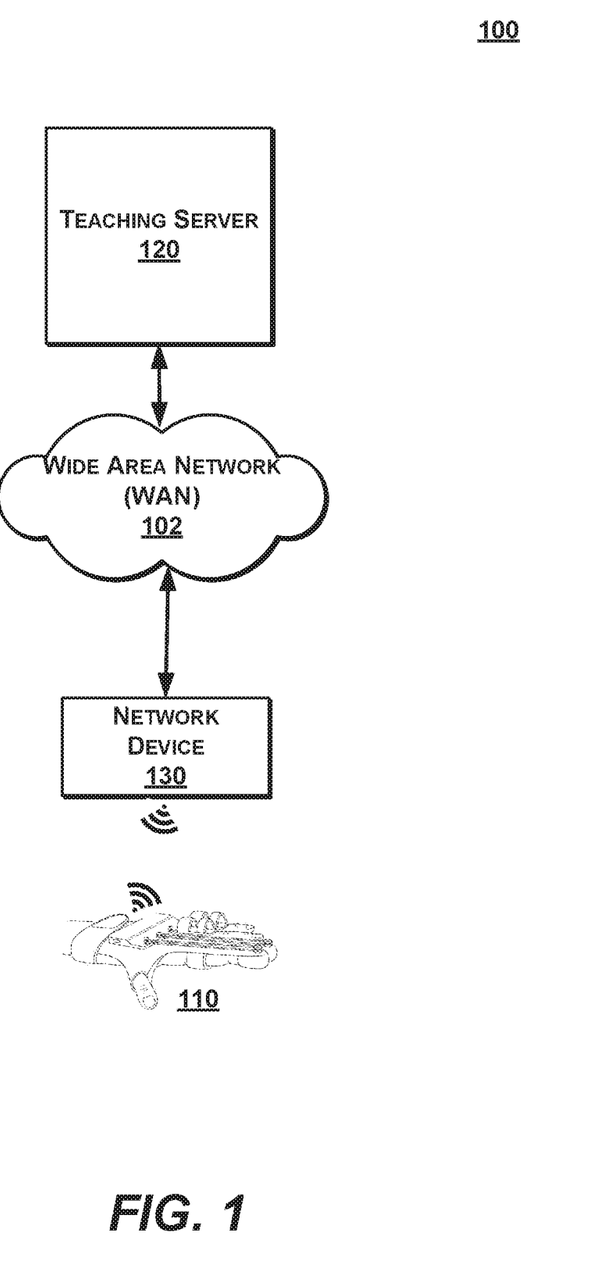
FIG. 1 is a high-level block diagram illustrating a system to enhance stringed instrument learning, according to one embodiment.

FIG. 1 is a high-level block diagram illustrating a system 100 to enhance stringed instrument learning, according to one embodiment. The system 100 includes, a wearable device 110, a teaching server 120, and a network device 130. The components can be implemented in hardware, software, or a combination. The system 100 is merely an example of many possible configurations which could also include well known components such as routers, switches, and firewalls.

The wearable device 110 is coupled to the network device 130. In turn, the network device 130 is coupled to the WAN (wired access network) 102. The teaching server 120 is also connected to the WAN 102. Connections can be wireless (e.g., Wi-Fi or Bluetooth) or wired (e.g., USB). The WAN 102 can alternatively be a LAN (local access network), the Internet, a 3G or 4G network, a hybrid network.

The wearable device 110 can be a glove or other appropriate apparatus that secures to a user hand while playing a stringed instrument. The wearable device 110 aids the user with dexterity building exercises, diagnosis algorithms, and grading algorithms. Teaching and training techniques include, but are not limited to, finger independence, striking force, desirable tone color, control of movement, relaxed and tension free strokes. Each of the fingers (e.g., index, middle, ring, pinky) can be individually trained and analyzed. The training methods can include plucking (e.g., guitars), bowing (e.g., violins) and striking (e.g., pianos).

The wearable glove 110 can also provide feedback to user stringed instrument playing, in real-time, in some embodiments. Sensors allow monitoring of a user that is playing a stringed instrument, for example, for grading. Also, feedback can be displayed to the user either in real-time or after a session.

The teaching server 120 manages training sessions and curriculum. User performance information is uploaded to develop a customized profile for user techniques. A specific training regimen can be developed by the teaching server 120, and then downloaded to the wearable device 110 for use while playing. Moreover, the teaching server 120 can provide real-time feedback or grading during stringed instrument playing.

In one embodiment, the teaching server 120 services multiple users and secures individual user profiles. A user can connect through the network 102 from a first location and complete a portion of training, and then subsequently connect through the network 102 from a second location to complete another lesson.

The network device 130 provides network connectivity for the wearable device 110, if needed. Some embodiments of the wearable device 110 include a Wi-Fi radio for directly connecting to the network 102. For example, a smartphone, a tablet device, networked watch, a PC or an access point can connect to the wearable device 110 using Bluetooth or some other medium, and connect to the network 102 using Wi-Fi, in cases that the wearable device 110 does not have an integrated radio. The display device in the embodiment of FIG. 1 is provided by the network device 130 (e.g., a smartphone) but can be a separate device. The display device shows feedback of user performance while playing stringed instruments. Visual, audio, and/or text feedback can show grading, sensor data, charts, or like.

The network 102 couples the components in communication for data transfers in the form of frames. Some components are preferably wired to the network 102. The network 102 can be a LAN, WAN, the Internet, a cloud-based network, a data network, a cellular network, a hybrid network, or the like. The system 100 is merely an example of many possible configurations which could include more or less access points, controllers, stations, and can also include well known components such as routers, switches, and firewalls.

FIGS. 2A-J are more detailed block diagram illustrating the wearable device of FIG. 1, according to one embodiment. The wearable device 110 comprises a frame 210, finger assemblies 220, and a control unit 230. Other embodiments are possible.

The frame 210 secures the wearable device 110 to a user with a Velcro wrist strap or other mechanism 212. The Velcro also permits adjustments to various hand sizes, although the wearable device 110 itself can be generally sized as small, medium or large.

In one embodiment, thumbscrews 216 couple the finger assemblies 220 inserted to one of the ports 214 of the frame 110 at a desired position according to finger length of a user. The attachment holds in the finger assemblies 220 while still allowing vertical movement stemming from fingers. In another embodiment without the thumbscrews 216, a hard stop to for coupling the finger assemblies 220. In more detail, when a main enclosure top and bottom 214 of the frame 210 are secured together by thumbscrew 216 in one of notches 214 of the bottom 214, motion is constrained at a variable length.

Figure 2A:
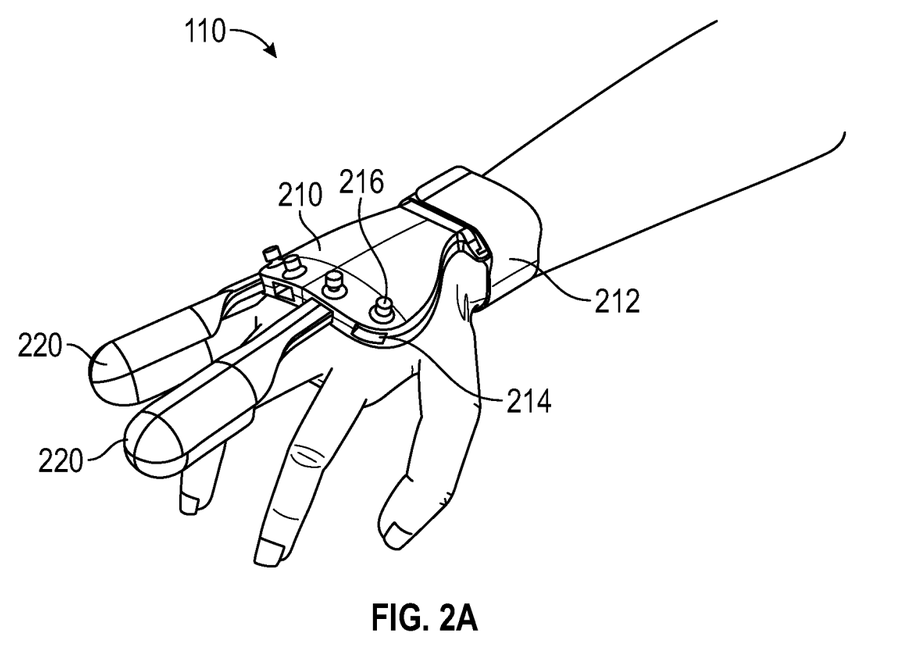
FIGS. 2A-2J are more detailed perspective diagrams illustrating a wearable device of FIG. 1, according to one embodiment.
Figure 2B:
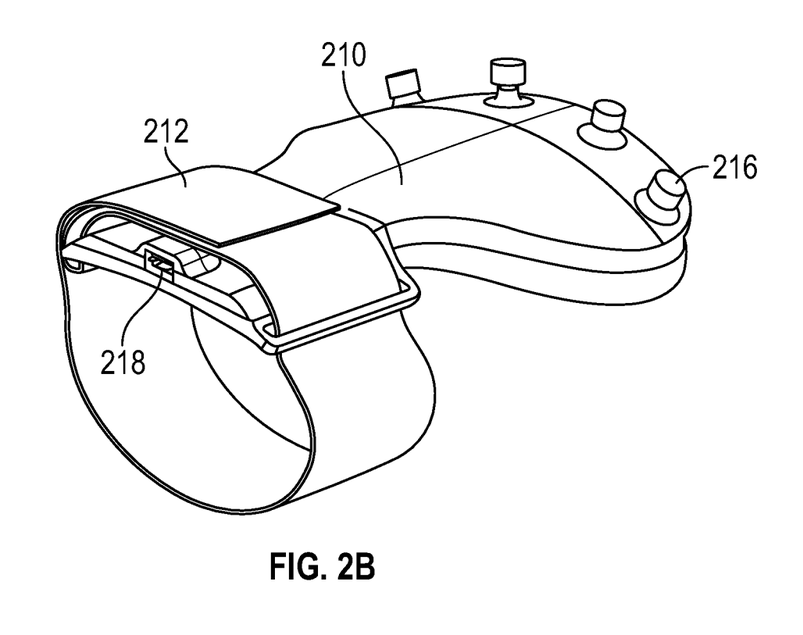
Figure 2C:
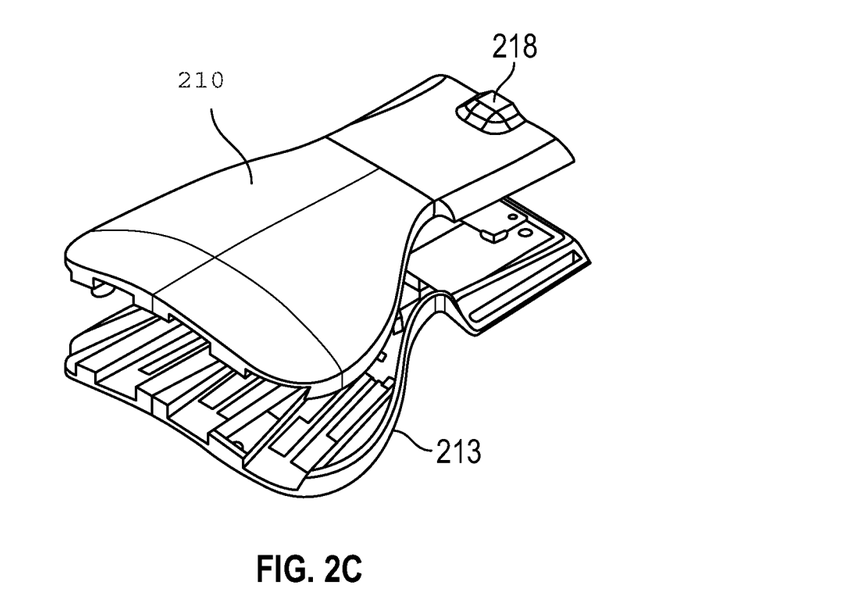
Figure 2D:
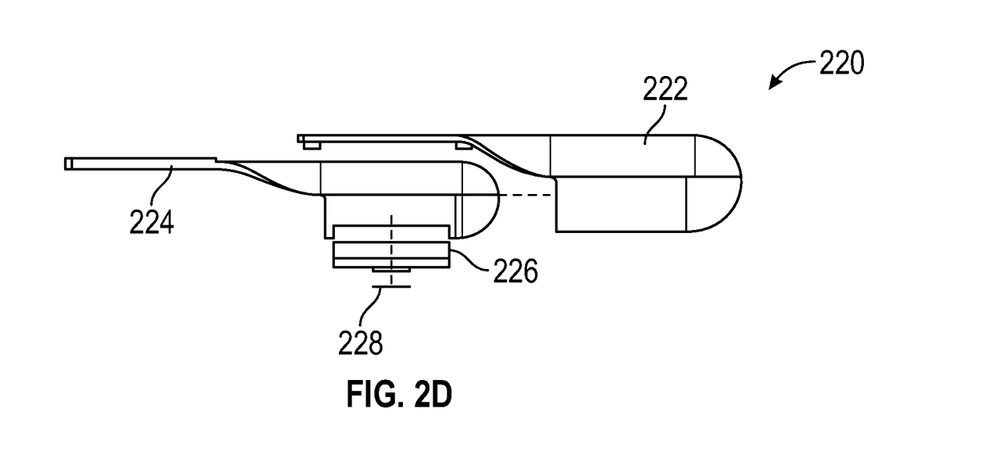
Figure 2E:
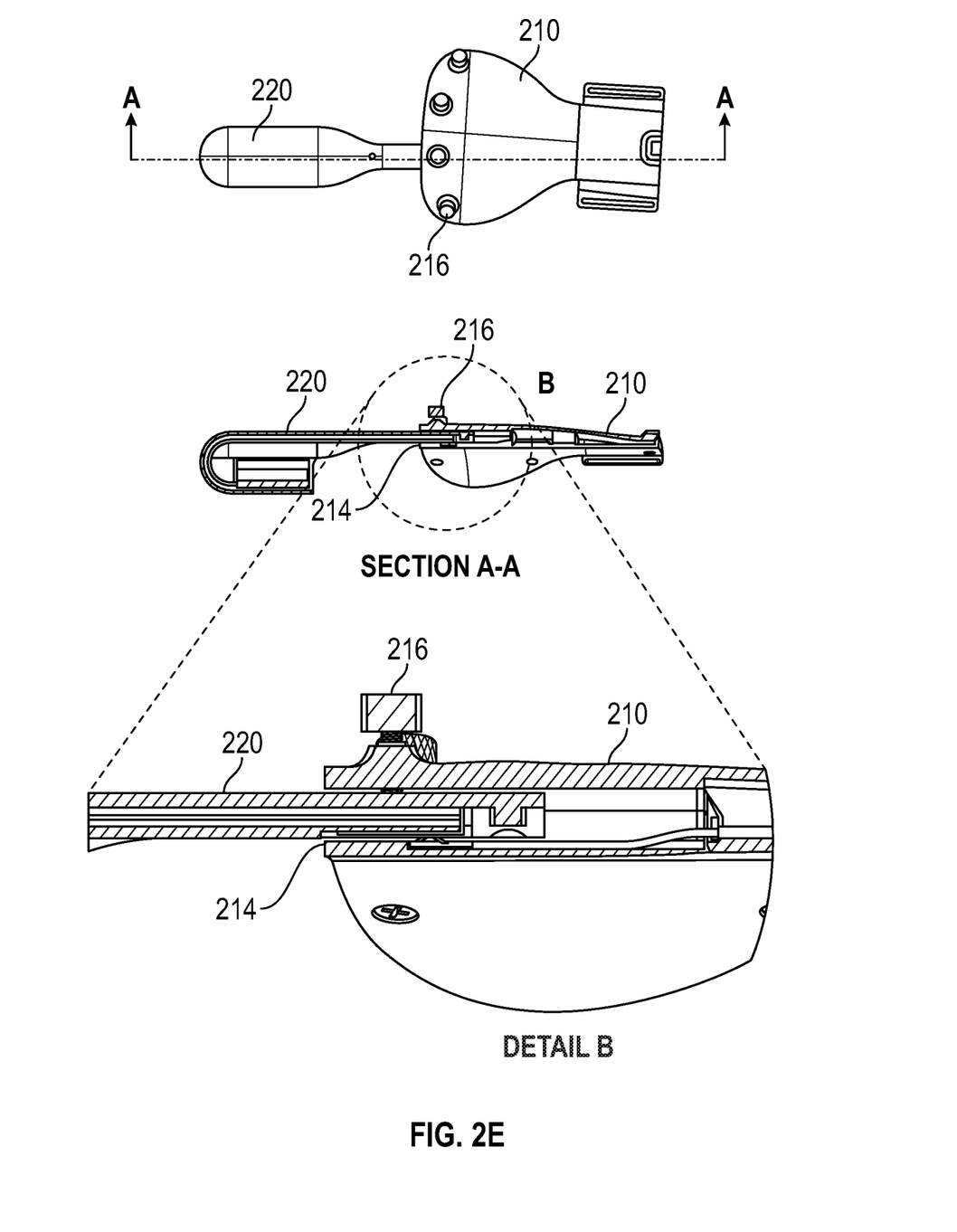
Figure 2F:
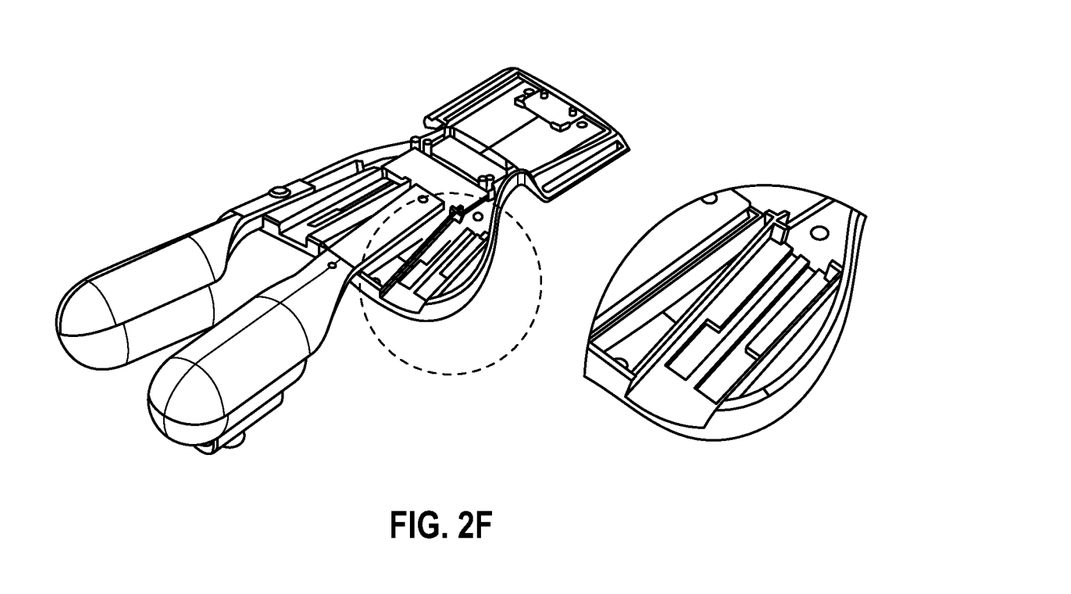
Figure 2G:
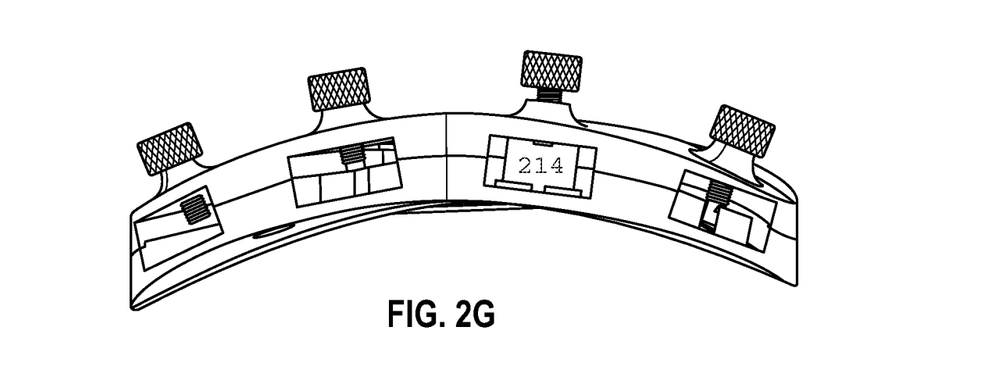
Figure 2H:
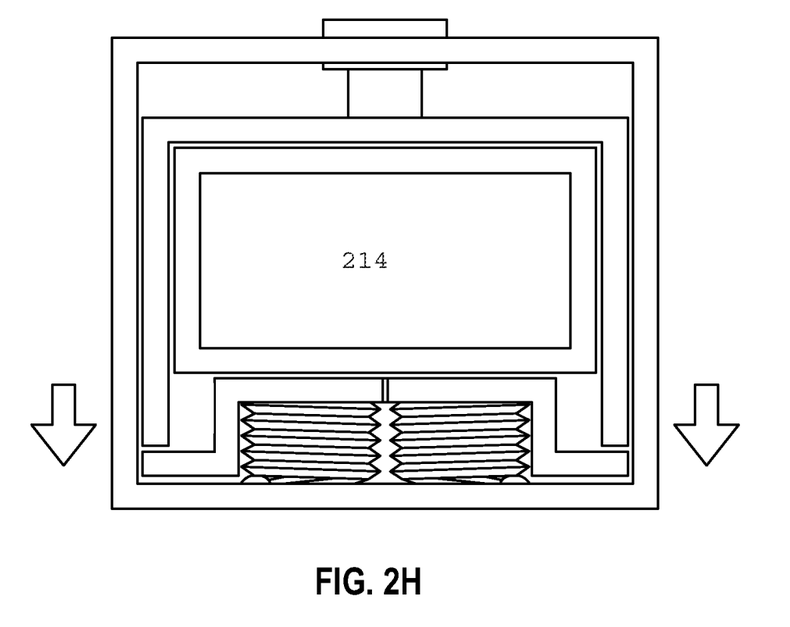
Figure 2I:
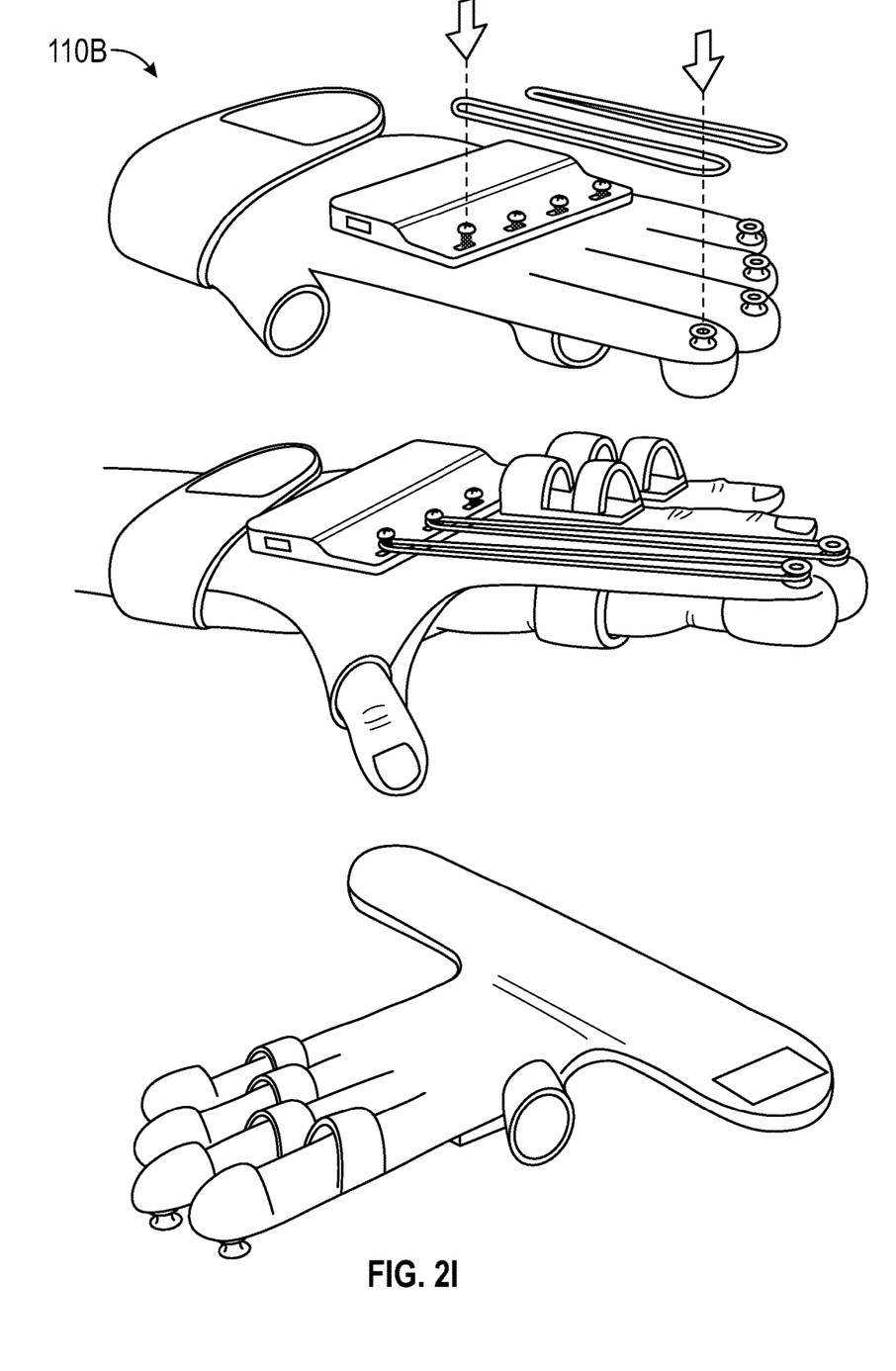
Figure 2J:
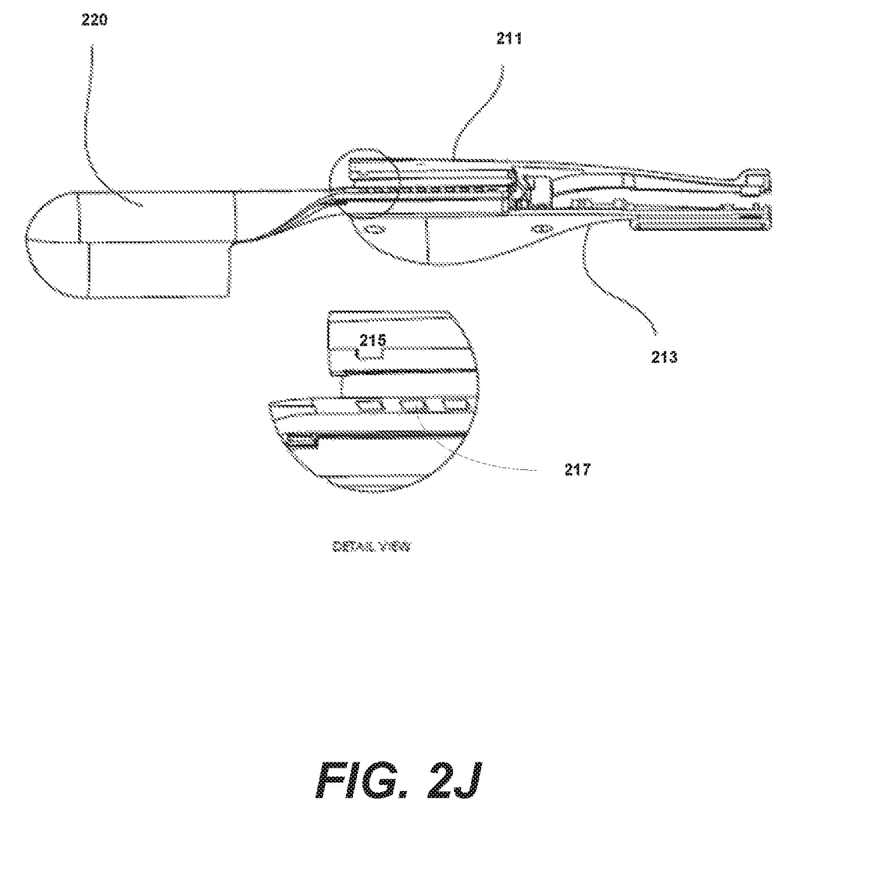
Figure 3:
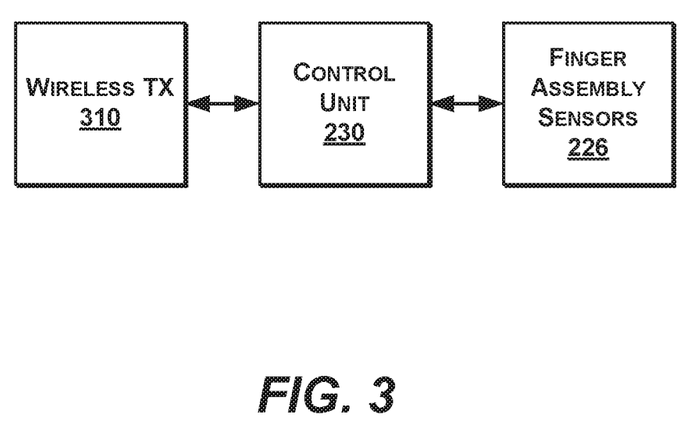
FIG. 3 is a block diagram illustrating an electronics architecture, according to one embodiment.

The frame 210 also includes a housing for the control unit 230 and connections for finger assemblies as shown in FIG. 2G. The housing can be a plastic, rubber or other rigid material to protect electronics from the ambient environment. A port 212 couples each finger assembly to the frame 210. Movements up and down from finger movement can be captured by sensors within the housing, or by sensors along each finger assembly 220.

There can be one to five finger assemblies 220 that are house sensors for the fingers, and can also be configured to immobilize fingers. The sensors 226 can be placed in various locations. In one embodiment, a single sensor is triggered whenever contacted by a finger. In another embodiment, several sensors 226 per finger further discriminate what portion of the finger is moving and further characterizes the movement, relative to a single sensor 226. Sensor placements can include one or more of the finger segments (distal phalanx, middle phalanx, proximal phalanx) or finger creases (distal interphalangeal, proximal interphalangeal, and palmar digital). The thumb can have a single sensor even if the fingers have several sensors 226. The palm or other areas of the hand or other parts of the body can be monitored by sensors, in a different embodiment.

The control unit 230 can comprise a processor and a memory device, in an embodiment. Other embodiments can include a network interface device, an input/output device, and other conventional computer components. Interface 218 is one example of an input/output device. The control unit 230 can be implemented by the general computer architecture shown below with reference to FIG. 6.

FIG. 3 shows the electrical connections between components of the wearable device 110. The control unit 230 is electrically coupled to finger assembly sensors 226 for one or more fingers. The controller unit 230 is also electrically coupled to a wireless transceiver 310. In embodiments in which the wearable device 110 is wired to the network device 130, an additional electronic connection exists.

II. Methods for Enhanced Stringed Instrument Learning (FIGS. 4-5)

Figure 4:
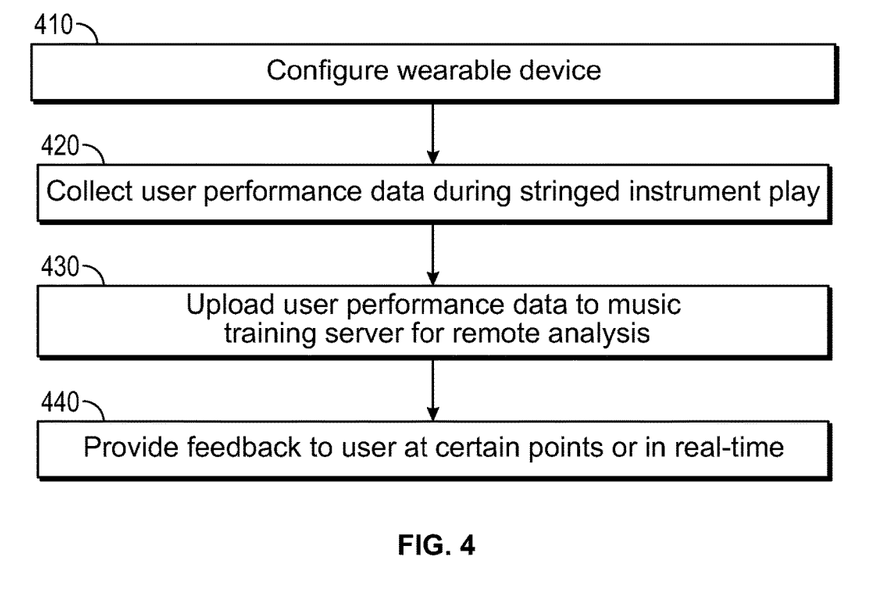
FIG. 4 is a flow chart illustrating a method for enhancing stringed instrument learning, according to one embodiment.

FIG. 4 is a block diagram illustrating a method for enhanced stringed instrument learning, according to one embodiment. One of ordinary skill in the art will recognize that the method 400 is non-limiting as other embodiments can have more or less steps and can be performed in a different order.

A wearable device is initially configured (step 410). Preparations before playing instruments, a user profile can be created on a music training server. Training regimens can be downloaded from the music training server to the wearable device and stored in memory. During stringed instrument playing sensors of the wearable device can collect and store user performance data local step 420). The user performance data can be uploaded (all or in part) for remote analysis (e.g., a music training server), preferably in real-time (step 430). The analysis is configurable and can include individual components such as tempo, pressure, movement, and the like. A general score can be calculated to rate overall metrics, or improvement. Feedback is provided to the user either at certain points or in real-time, for example, as processed and downloaded from the music training server (step 440). As described herein, feedback can be visual, audio, text or a combination.

Figure 5:
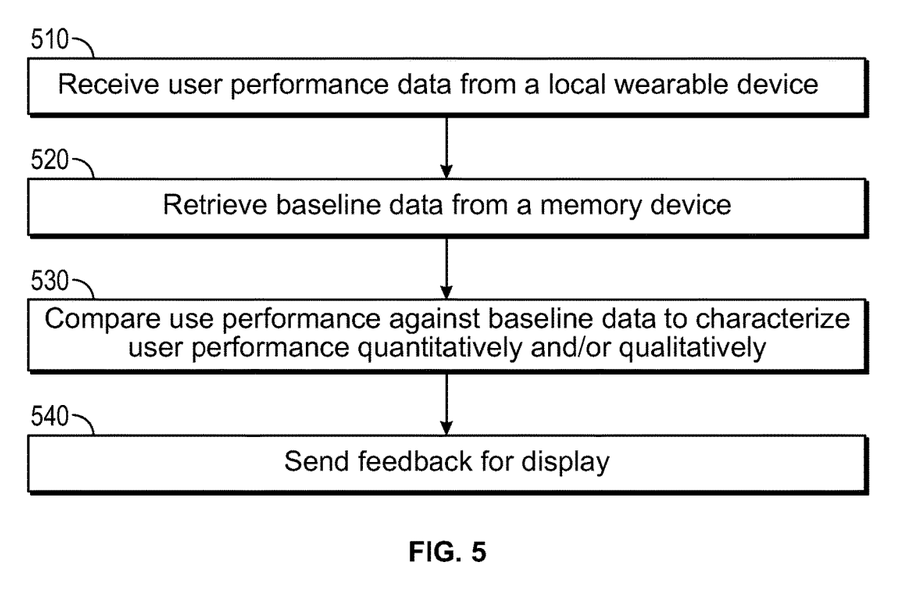
FIG. 5 is a more detailed flow chart illustrating a step of user performance data analysis within the method of FIG. 4.

FIG. 5 is a more detailed block diagram illustrating remotely occurring processes at the music training server between steps 430 and 440 of the method 400, according to one embodiment.

The user performance data is received at the music training server (step 510). The user performance data from the sensors can include finger positioning, frequency, pressure, movement, and the like. Sensor data can also include audio recordings of instrument playing, video of finger positioning, and more. A particular lesson or song associated with the user performance data is retrieved from memory or remotely (step 520). A processor compares the user performance data against baseline parameters to characterize user performance quantitatively and qualitatively (step 530). Feedback is then sent back downstream for display to the user and/or teacher (step 540).

III. Generic Computing Device (FIG. 6)

Figure 6:
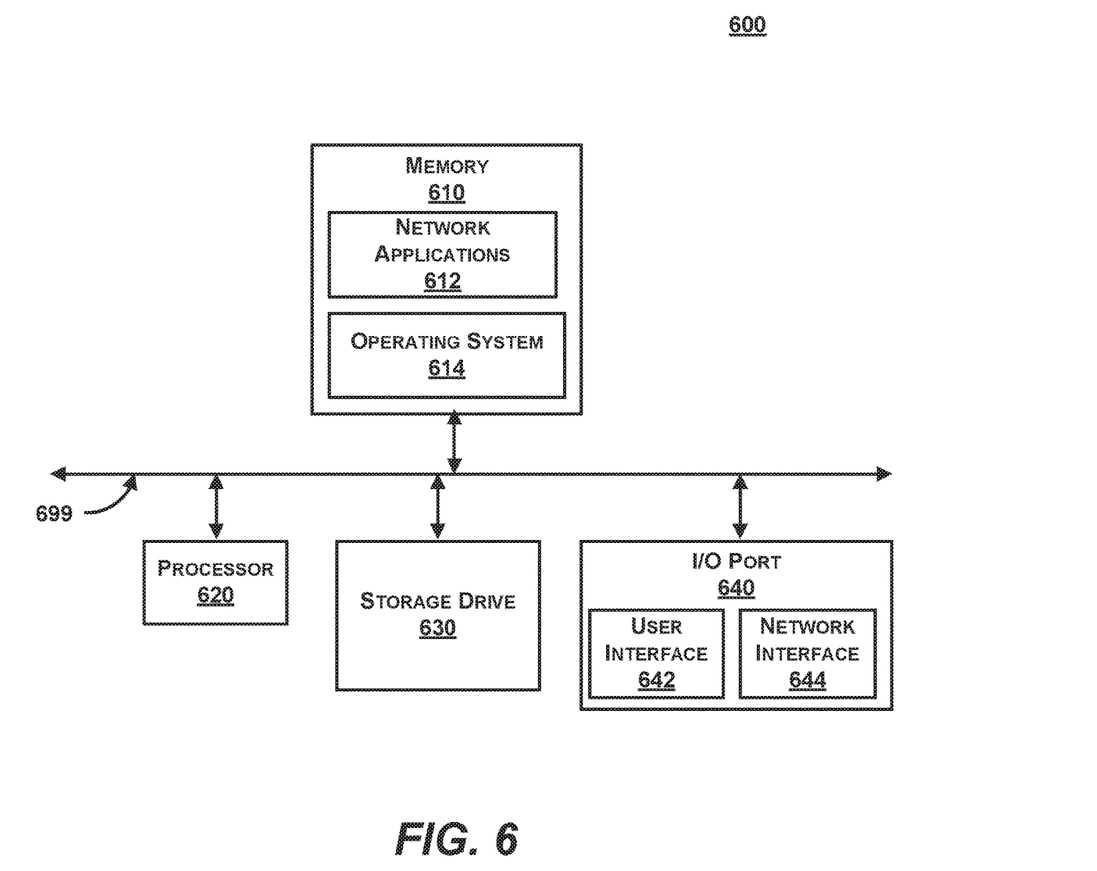
FIG. 6 is a block diagram of an exemplary computing environment, according to an embodiment.

FIG. 6 is a block diagram illustrating an exemplary computing device 600 for use in the system 100 of FIG. 1, according to one embodiment. The computing device 600 is an exemplary device that is implementable for each of the components of the system 100, including the congestion module 110, the Wi-Fi controller 120, the SDN controller 130, the access points 140A, 140B, and the stations 150A-150C. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the components illustrated in FIG. 1. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 65, 68, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A wearable electronic device for users training on string instruments, the wearable device comprising:
   a control unit comprising a processor and a memory device;
   a frame formed to fit over a hand of a user while playing a stringed instrument;
   a finger assembly for each finger of the hand, each finger assembly coupled to the frame to allow mobility for each finger of the hand while playing the stringed instrument; and
   a sensor array, coupled to each finger assembly and to the control unit, to determine at least a positioning of fingers on the stringed instrument, and to send user performance data to the control unit,
   wherein the control unit analyzes the user performance data and outputs feedback to the user based on the performance data analysis.

2. The device of claim 1, further comprising:
   a network interface device wirelessly coupled to a data network to upload the performance data to a music training server in real-time while playing the stringed instrument, wherein the music training server analyzes the user performance data and sends feedback for display to the user.

3. The device of claim 1, wherein the output to the user comprises visual feedback.

4. The device of claim 1, wherein the output to the user comprises physical feedback.

5. The device of claim 1, further comprising:
sending visual feedback information to a wirelessly connected device for display to the user on a screen.

6. The device of claim 1, wherein the frame includes a material to fit the fingers of the user.

7. The device of claim 1, wherein the sensor array determines one or more characteristics of fingers while playing the stringed instrument, the one or more characteristics comprising: orientation of the mobilized fingers, a pressure magnitude of the mobilized fingers, and a movement frequency of the mobilized fingers.

8. The device of claim 1, wherein each of the finger assemblies is in a first position to engage a finger for immobilization, and in a second position to disengage the finger allowing mobilization, wherein each of the finger assemblies couples to the device frame in the second position.

9. The device of claim 1, wherein the performance data analysis comprises a comparison of the user performance data against a baseline.

10. The device of claim 1, wherein a number of finger assemblies comprise five.

11. The device of claim 1, wherein the sensor array comprises an audio sensor to generate audio data from the stringed instrument during play.

* * * * *